United States Patent [19]
Gitelman et al.

[11] Patent Number: 5,290,380
[45] Date of Patent: Mar. 1, 1994

[54] METHOD FOR RECOVERING BREAKER METAL CORD THREADS FROM TIRES

[75] Inventors: Alexandr I. Gitelman; Valery V. Kalinchak; Svetlana G. Orlovskaya, all of Odessa, U.S.S.R.

[73] Assignee: Alexandr Isaakovich Gitelman, Odessa, U.S.S.R.

[21] Appl. No.: 824,101

[22] Filed: Jan. 22, 1992

Related U.S. Application Data

[63] Continuation at PCT/SU90/00072, Mar. 22, 1990, WO91/14553.

[51] Int. Cl.[5] .............................................. B32B 35/00
[52] U.S. Cl. .................................... 136/344; 156/584; 29/403.4; 264/37
[58] Field of Search ............... 156/344, 584, 95, 272.2; 29/403.4; 264/37

[56] References Cited

U.S. PATENT DOCUMENTS 1,459,693  6/1923  Rand et al. ........................... 156/344

FOREIGN PATENT DOCUMENTS

| 0054176 | 6/1982 | European Pat. Off. ........... 29/403.4 |
| 2903431 | 8/1980 | Fed. Rep. of Germany ...... 156/344 |
| 3823952 | 1/1990 | Fed. Rep. of Germany ...... 156/344 |
| WO91/14553 | 10/1991 | PCT Int'l Appl. . |
| WO91/14554 | 10/1991 | PCT Int'l Appl. . |
| 0763150 | 9/1980 | U.S.S.R. .............................. 156/344 |
| 1194687 | 11/1985 | U.S.S.R. . |
| 2061292 | 5/1981 | United Kingdom ................ 156/344 |

*Primary Examiner*—David A. Simmons
*Assistant Examiner*—Mark A. Osele
*Attorney, Agent, or Firm*—Keck, Mahin & Cate

[57] ABSTRACT

A method involves heating metal cord threads and separating metal cord threads from rubber. Output is increased and power consumption of the process is lowered by preliminarily completely cutting through a tire in such a manner as to expose the ends of metal cord threads and by heating these threads to a temperature of complete thermooxidation destruction of rubber layers adjacent to these metal cord threads.

4 Claims, 2 Drawing Sheets

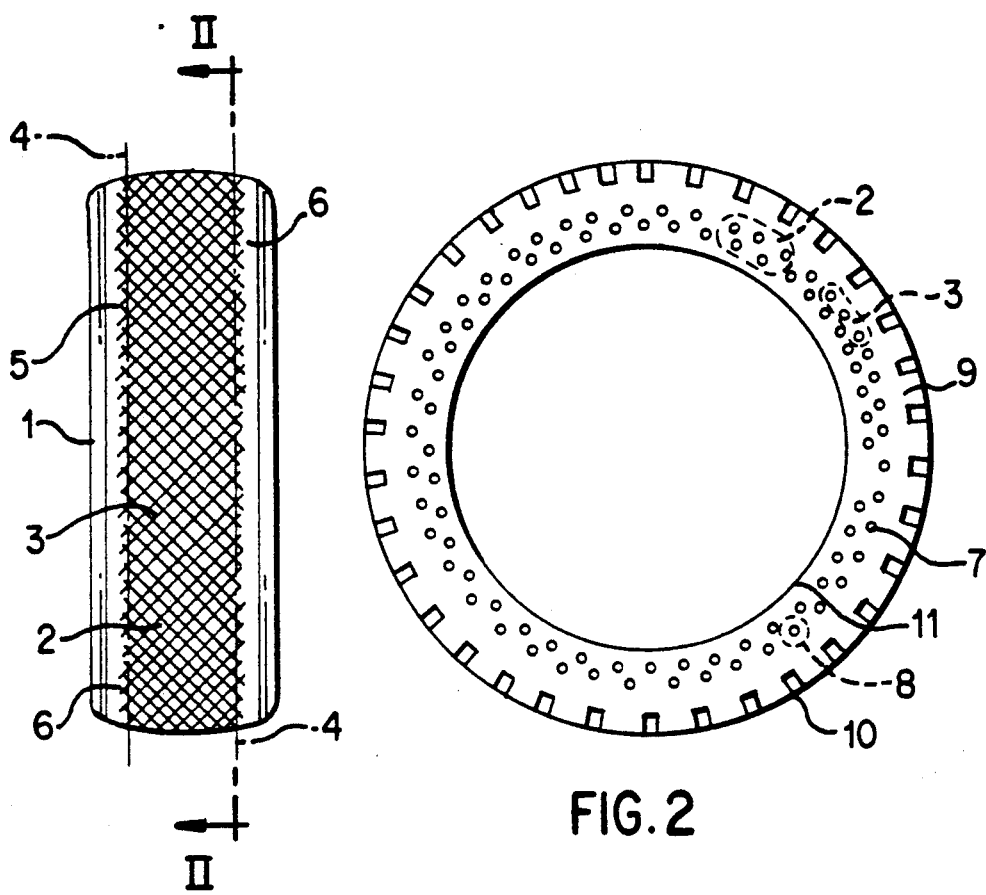
FIG. 1
FIG. 2
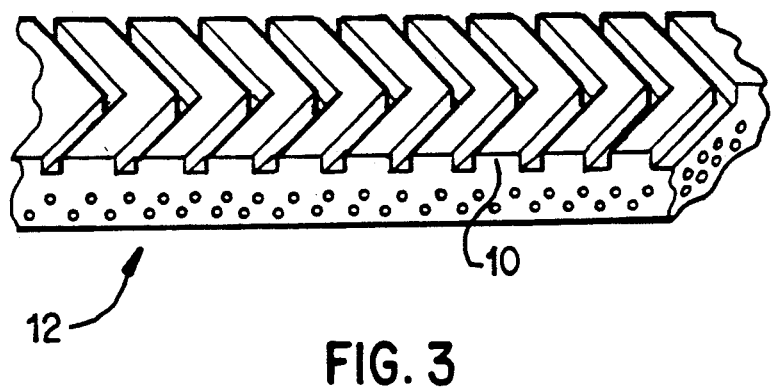
FIG. 3

METHOD FOR RECOVERING BREAKER METAL CORD THREADS FROM TIRES

This is a continuation of application PCT/SU90/00072, filed Mar. 22, 1990 now published as WO91/14553.

FIELD OF THE INVENTION

The invention relates to processing of worn or rejected rubber articles, and more specifically, it deals with methods for recovering metal cord threads from tires. The invention may be used at regeneration and tire retreading plants and at rubber manufacturing plants.

STATE OF THE ART

Known in the art is a method for recovering breaker metal cord threads from tires involving heating metal cord threads in a high-frequency electromagnetic field and separating the threads from rubber (SU, A, 763150). The metal reinforcement is heated in the electromagnetic field until its surface in contact with rubber reaches a preset temperature at which the nearest rubber layers are fused, and the reinforcement is removed.

The disadvantage of this method resides in a low output because of a complicated operation of separation of metal reinforcement (metal cord threads of the breaker) from rubber since viscous cohesion between the cord threads and the fused surface of the nearest rubber layers has to be overcome.

This state of the art method is also deficient because liquid viscous components of fused rubber (rubber oils) are present on both metal cord and rubber liberated from the cord which impair utility properties of the material during further processing of rubber and metal cord. Both manual and mechanized processing of rubber are complicated without the removal of these components.

This method also requires much energy since heating of metal reinforcement is carried out without air access, and energy for activating thermal destruction amounts to 270 to 290 kJ/mol.

SUMMARY OF THE INVENTION

The invention is based on the problem of providing a method for recovering breaker metal cord from rubber tires in which an autocatalytic heating and destruction are ensured by changing the heating temperature and carrying out the heating in the presence of oxygen for thermooxidation destruction, the rubber layers nearest to breaker metal cord threads being pulverized without formation of oils so as to increase output, lower power requirements and enhance utility properties of rubber.

This problem is solved by the fact that in a method for recovering breaker metal cord threads from rubber tires, comprising heating breaker metal cord threads in a high-frequency electromagnetic field and separating them from rubber, according to the invention, a tire is completely cut through the breaker before the heating in a plane drawn perpendicularly with respect to its axis of rotation in such a manner as to expose the ends of all metal cord threads, the heating of the cords being carried out to a temperature of complete thermooxidation destruction of rubber layers nearest to the metal cord threads.

Cutting a tire completely through the breaker to expose the ends of all metal cord threads thereof to ensure oxygen access to these ends and to rubber layers adjacent thereto with subsequent heating of breaker metal cord threads to a temperature of complete thermooxidation destruction (this temperature here means the temperature at which complete thermal decomposition of rubber occurs into carbon and a hydrocarbon gaseous product) allow rubber layers adjacent to metal cord threads to be pulverized so as to rule out formation of a liquid fraction. The breaker metal cord is thus automatically separated from the thread and carcass of the tire. This greatly facilitates removal of breaker metal cord threads and enhances output.

It should be also noted that the presence of oxygen in the heating zone ensures the autocatalytic mode of thermal destruction of rubber with an energy of activation of thermooxidation destruction amounting to 150 to 190 kJ/mol., whereas a similar process without air access (state of the art method) requires 270 to 290 kJ/mol. Power requirements are thus much lower.

In addition, owing to the complete thermooxidation destruction of rubber layers adjacent to breaker metal cord threads the inner surfaces of the tread and carcass rubber remain dry so as to substantially enhance utility properties of these rubber pieces and rule out additional handling of these surface during further processing.

To facilitate processing and removal of breaker metal cord threads, the complete cutting of tires may be carried out through both longitudinal borders of these threads. This cutting through the tire allows a ring with the breaker to be formed. The two side walls thus separated from the tire, which do not have breaker and which are of a substantially planar configuration, facilitate utilization as ring spacers and for blanking new parts.

To increase output, a ring having the breaker is cut in a plane drawn through the axis of rotation to form a strip. This allows the most simple zone-type flow-line method of processing. In addition, the planar strip-like shape of the tread and carcass parts (after separation from metal cord threads) is the most suitable for processing to enhance productivity in blanking rubber articles and intermediate products.

It is preferred, in the method according to the invention, that in heating the exposed ends of breaker metal cord threads an oxygen medium be provided by supplying oxygen so as to substantially lower power requirements because in this case an energy of activation of thermooxidation destruction of rubber is as low as 80 to 110 kJ/mol. In addition, this accelerates thermal destruction and enhances output.

BRIEF DESCRIPTION OF THE DRAWINGS

The invention will now be described in detail with reference to the accompanying drawings illustrating a method for recovering breaker metal cord threads from rubber tires, in which:

FIG. 1 is a view of the working part of a tire with exposed metal cord (the tread is not shown);

FIG. 2 is a view of a ring with a breaker in a section taken along line II—II in FIG. 1, with tread;

FIG. 3 schematically shows a developed strip with a breaker;

PREFERRED EMBODIMENT OF THE INVENTION

Figure 4:
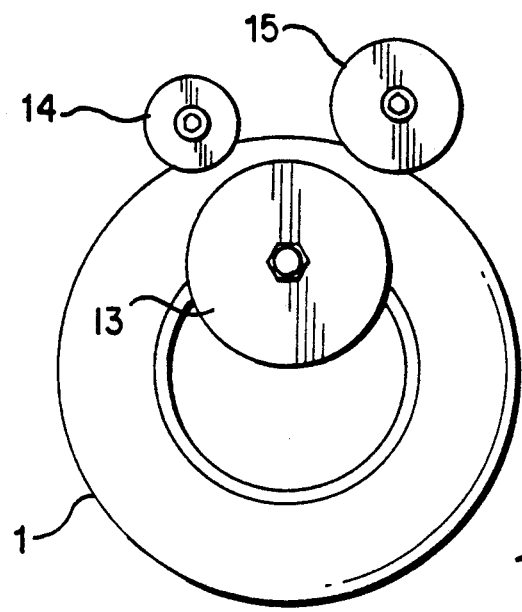
FIG. 4 is a front elevation of an apparatus for cutting a tire.

FIG. 1 shows a tire 1 being processed having a breaker 2 which has two plies of metal cord threads 3 and a line 4 along which tire 1 is cut, cut-off ends of breaker metal cord threads 3, and two side walls 6.

FIG. 2 shows exposed ends 7 of breaker metal cord threads 3 and rubber layers 8 nearest to threads 3.

In addition, a ring 9 formed after the cutting of tire 1 is shown which has a tread 10 and a carcass 11 as well as breaker 2. FIG. 3 also shows a strip 12 obtained after cutting ring 9.

Figure 5:
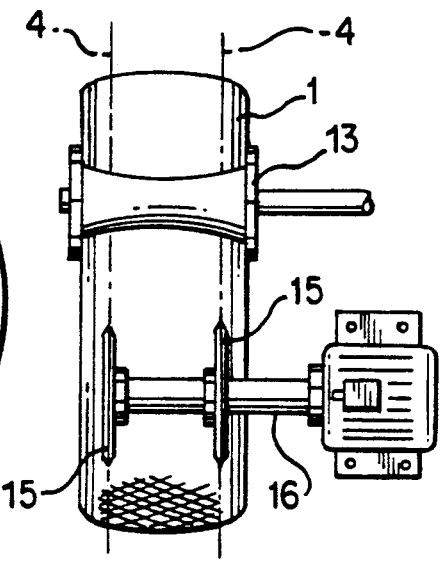
FIG. 5 is a plan view of the apparatus of FIG. 4.
Figure 6:
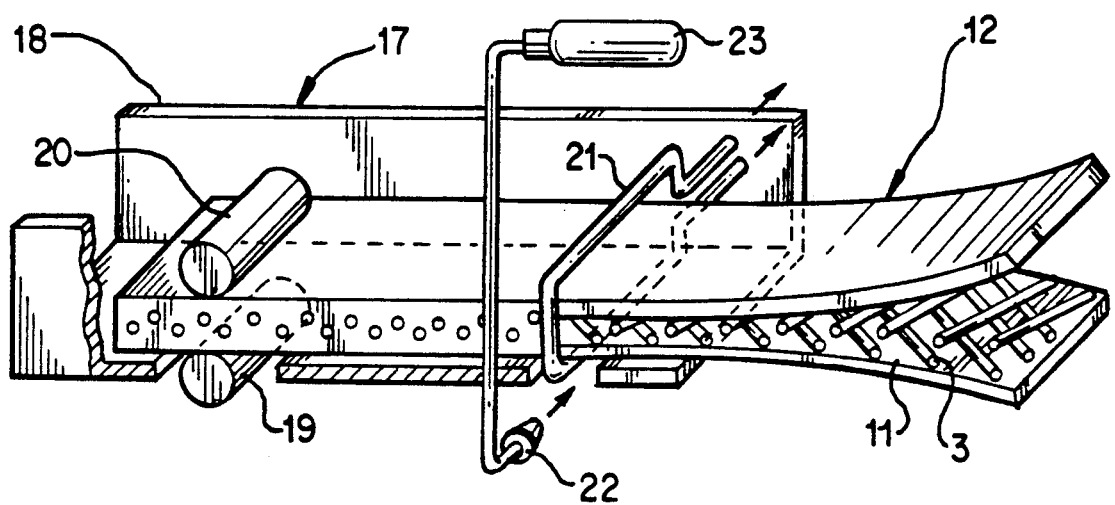
FIG. 6 is a schematic view of an apparatus for heating a strip with a breaker.

FIGS. 5 and 6 show an apparatus for cutting tire 1 which comprises a driven pressure roll 13 and an idle pressure roll 14 and a pair of circular knives 15 (only one is shown) with a drive 16. Line 4 along which the tire is cut is also shown in FIGS. 4, 5.

FIG. 6 schematically shows an apparatus 17 for heating the strip with the breaker, comprising a trough-like casing 18, a pair of pressure rolls having a driven roll 19 and an idle roll 20, an inductor 21 of a high-frequency generator (not shown), an outlet nozzle 22 for oxygen supply from a bottle 23, as well as tread 10, carcass 11 and metal cord threads 3 which are connected to one another.

A method for recovering breaker metal cord threads from a tire is carried out in the following manner.

Rubber tire 1 (FIGS. 1, 4 and 5) is placed on driven pressure roll 13 and is pressed against it by means of idle pressure roll 14. Two circular knives 15 coupled to drive 16 are then used for completely cutting through tire 1 along a local portion of tire 1. Driven roll 13 is then used for rotating the tire whereby complete cutting through tire 1 is carried out along a plane drawn perpendicularly with respect to its axis of rotation along both borders of metal cord threads of breaker 2 (along lines 5) (FIG. 1), and their ends 7 are exposed. As a result of the above cutting-through operation ring 9 is formed (FIG. 2) with breaker 2 and also a pair of side walls 6 (FIG. 1). It will be apparent to those skilled in the art that diameter of the circular knives, their rotation speed and the speed of cutting through the tire, as well as the width of a ring with the breaker depend on the size of the tire being handled.

To facilitate processing and recovery of metal cord threads 3 by using the zone-type flow-line method, the resulting ring 9 with breaker 2 is cut by any appropriate known method, e.g., by means of a circular knife in a plane drawn through its axis of rotation. This results in obtaining strip 12 (FIG. 3).

Strip 12 is then placed into casing 18 (FIG. 6) of apparatus 17 for heating the strip with breaker in which the strip is inserted between pressure rolls 19, 20 which are used to impart linear motion to strip 12 in a horizontal plane. Strip 12 is thus drawn through inductor 21 which is of rectangular configuration and which embraces the cross-section of strip 12 with a minimum air gap. This results in a zone heating of metal cord threads 3 which are present at a current moment in the zone of influence of rectangular inductor 21. Owing to the exposure of the ends of all metal cord threads, access of oxygen to these ends and to the adjacent rubber layers is ensured so as to achieve the complete thermooxidation destruction of the adjacent rubber layers for complete thermal decomposition of rubber into dry pulverulent technical carbon and a hydrocarbon gaseous product without formation of liquid fractions.

To enhance output and lower power requirements of the process, an oxygen medium is provided in a zone of the exposed ends of metal cord threads by supplying oxygen to this zone which is fed through nozzle 22 from bottle 23. The metal cord threads are thus liberated from the carcass and tread and can be easily separated from them by any known method, e.g., by means of an electromagnet and the like.

Therefore, pulverizing rubber layers adjacent to metal cord threads without the formation of liquid fractions allows removal of these threads to be substantially facilitated thus enhancing productivity. In addition, the presence of oxygen in the heating zone ensures the autocatalytic mode of thermooxidation destruction of rubber so as to substantially lower power requirements for the process in comparison with the state of the art method.

The tread and carcass rubber separated from metal cord threads is used for making single-piece rubber products on blanking presses or for producing regenerate. Metal cord threads are also used after reprocessing.

Dry carbon resulting from the thermal treatment is a finished product, and hydrocarbon gas is pumped from the treatment zone and is used as a gaseous fuel so as to ensure a completely waste-free process and protect the environment while retaining utility properties of the tread and carcass parts of rubber.

INDUSTRIAL APPLICABILITY

The invention may be highly effectively used at regenerating and tire retreading plants and also at rubber manufacturing plants.

What is claimed is:

1. A method for recovering breaker metal cord threads from rubber tires, comprising heating breaker metal cord threads in a high-frequency electromagnetic field and separating said metal cord threads from rubber of said rubber tires, wherein a tire is completely cut through the breaker before heating in a plane drawn perpendicularly with respect to the tire's axis of rotation in such a manner as to expose ends of all metal cord threads, and heating the cords to a temperature of complete thermooxidation destruction of rubber material contacting the metal cord threads.

2. A method of claim 1, comprising cutting the tire through the breaker to form three objects: a ring with the breaker and two side walls.

3. A method of claim 2, wherein after completely cutting the tire through the breaker, the method comprises cutting the resulting ring with the breaker in a plane drawn through the axis of the tire's rotation to form a strip.

4. A method of claim 1, comprising providing an oxygen medium in the zone of the exposed ends of metal cord threads while heating the metal cord threads by supplying oxygen to this zone.

* * * * *